United States Patent [19]

Verret

[11] Patent Number: 4,949,108
[45] Date of Patent: Aug. 14, 1990

[54] IMAGE SHOOTING METHOD FOR RECORDING VISUAL SPHERES AND DEVICE FOR IMPLEMENTING SUCH METHOD

[76] Inventor: Jean-Michel Verret, 83 rue du Faubourg Saint-Antoine, 75011 Paris, France

[21] Appl. No.: 180,981
[22] PCT Filed: Aug. 5, 1987
[86] PCT No.: PCT/FR87/00306
    § 371 Date: Mar. 31, 1988
    § 102(e) Date: Mar. 31, 1988
[87] PCT Pub. No.: WO88/01401
    PCT Pub. Date: Feb. 25, 1988

[30] Foreign Application Priority Data
Aug. 18, 1986 [FR] France ............................ 86 11598

[51] Int. Cl.⁵ .................. G03B 29/00; G03B 37/04
[52] U.S. Cl. ................................ 354/81; 354/77; 352/70; 352/243; 358/229
[58] Field of Search ................ 354/81, 293, 77; 352/69, 70, 71, 243; 358/229

[56] References Cited
U.S. PATENT DOCUMENTS
3,514,871 6/1970 Tucker .................................. 352/70
3,727,532 4/1973 Gregory ............................... 354/81
4,123,152 10/1978 Farnum ................................ 352/70
4,214,821 7/1980 Termes ................................ 352/70
4,673,268 6/1987 Wheeler ............................. 354/293

FOREIGN PATENT DOCUMENTS
2504490 10/1982 France .
1047728 11/1966 United Kingdom ................. 352/70
2171528 8/1986 United Kingdom .

OTHER PUBLICATIONS
Gessler, Camera, 43rd year, No. 6, Jun. 1964 "Polyvision" pp. 13–18.

Primary Examiner—A. A. Mathews
Attorney, Agent, or Firm—Sandler, Greenblum & Bernstein

[57] ABSTRACT

The device includes a U-shaped fixing support on which is secured an optical recording device. The support is also fixed by means of two axes aligned with each other and at right angles with the legs of the U-shaped fixing support. The support is pivotally mounted in bearings provided on the legs of a second fixing support which is fixed to a vertical axis pivotally mounted in a bearing provided in the upper face of a base which carries the bearing and further includes securing means for fixing the device to an appropriate support. The device enables the taking a plurality of photographs from a single focal point to thereby enable the recordation of and the re-creation of complete "environmental photograph" from a single point.

13 Claims, 2 Drawing Sheets

IMAGE SHOOTING METHOD FOR RECORDING VISUAL SPHERES AND DEVICE FOR IMPLEMENTING SUCH METHOD

BACKGROUND OF THE INVENTION

The present invention relates to a method and apparatus for taking views and enabling visual spheres to be recorded.

The wording "visual spheres", is defined as the whole luminous reality which can be seen from any point of the environment. Up to the present, it was not possible to take a complete surrounding photograph from any point of the environment. Devices for taking panoramic photographs, for example, were known, but none of these devices enables the whole luminous reality to be recovered.

SUMMARY OF THE INVENTION

One object of the invention is to solve the problem of producing as images, the whole luminous reality from any point of the environment by means of a method wherein a volume of revolution, for example a sphere, is devided into portions which may be substituted by plane surface areas or facings. These surface areas are then assembled to form a volume of revolution of substantially corresponding shape, for example a "pseudosphere".

Another object of the invention is to provide visual recording device enabling images to be recorded for any point of the environment, such images being able to recover the planes, faces or facings obtained from avoid volume of revolution while being able to possibly overlap each other.

Still another object of the present invention is to provide a device enabling the images corresponding to the facings which will be recorded and to be able to use the images thus recorded on to be projected on any space support of any volume of revolution located in any point of the environment, whatever may have been used for previously recording.

Thus, the present invention relates to a method for taking photographs and enabling the visual spheres to be recorded, wherein a surface area of revolution, for example, a sphere, is divided into portions which are able to be replaced by plane surface areas or facings. As many photographs as facings are taken for a first given point of the environment ("first shot point") by using suitable optical or video-optical means while determining the orientation of each photograph with respect to the latitude and the longitude. The images corresponding respectively to the facings are recorded and the images thus recorded are projected on any space support of any volume located around a second space point of the environment ("second shot point"). The first shot point may be spatially identical or different from the second shot point.

The invention also relates to a device for embodying the above-stated method. This device includes a U-shaped fixing support on which is mounted recording optical means. The support is affixed by means of two axes bearing on the legs of the U-shaped support is and pivotally mounted in bearings provided into the legs of a second U-shaped fixing support which is secured to a vertical axis pivotally mounted in a bearing within the upper face of a leg. A face opposite that provided for the bearing of the vertical axis includes a means for affixing the device to suitable support means, thus enabling optical recording means to be moved about two perpendicular axes defined by the respective extensions of the aforesaid axes to be able to rotate in any direction around the focal point defined by the intersection of the axes.

The optical means may any optical or video - optical devices able to record photographs and to restore them on supports so as to able to do further work. Motor-reduction means, which is usually a reducer transmitting the movements of a motor, for example an electrically driven motor, are also provided to respectively locate the fixing supports and the optical means. The motor may be controlled by electronic information means consisting, for example, of an electronic cooperating with a microprocessor card. These electronic information means are connected to an electric supply system, such as batteries.

BRIEF DESCRIPTION OF THE DRAWINGS

Other advantages and features of the present invention will appear from the description which follows with reference to the drawings illustrations by way of a non-limitive embodiment of the method and apparatus of the invention in which.

DETAILED DESCRIPTION OF THE PREFERRED EMBODIMENTS

Figure 1:
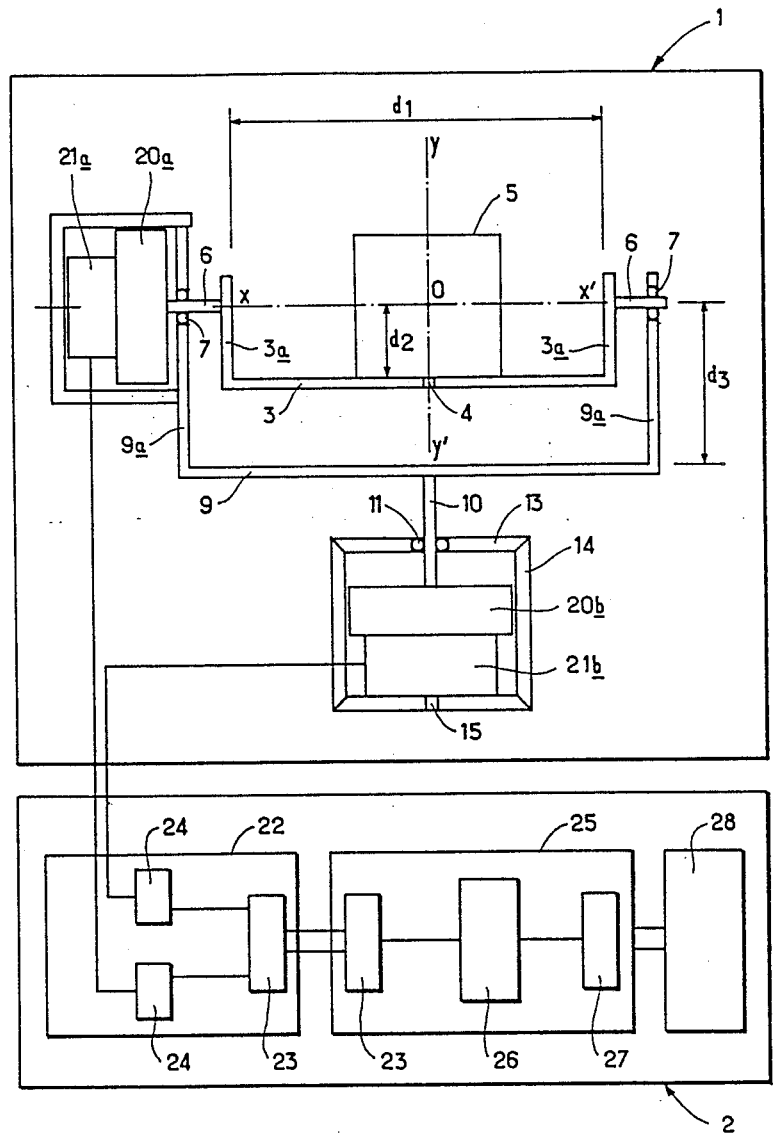
FIG. 1 is a diagrammatic view of the device intended to embody the method of taking photographs according to the invention.

As shown in FIG. 1, the device for taking photographs according to the invention comprises an electro-mechanical portion embodied within the frame 1 and an electronic information portion embodied within the frame 2.

The electro-mechanical portion consists of a first U-shaped fixing support 3 which includes fixing means 4 for an optical recording device 5 at the base. This support 3 comprises on its lateral legs 3a two external axes 6 integral at right angle to the legs, the extension of the axes extending within the support 3 to constitute an axis x—x'. The axes 6 are respectively mounted within cages or bearings 7 having axes which also coincide with axis x—x'. These bearings 7 are respectively secured to legs 9a of a second U shaped fixing support 9 which is affixed to a vertical axis 10 which extension extends to define an axis y—y' crossing axis x—x' at point O. This vertical axis 10 is mounted into a bearing or bevel cage 11 the, axes of which are located along the extension of axes y—y'. The bearing 11 is affixed to the upper partition 13 of a support means 14 which is provided with a system enabling its fixation on a support (for instance a hole threaded at the Kodak pitch used for affixing an element on a photographic tripod).

This device is designed as to enable the optical recording device to be moved about to two perpendiculars axes so as to be rotated in any direction around the focal point or optical focus of the device, which coincides with the intersection O of axes x—x' and y—y'. The distance d1 between the legs 3a of support 3 must enable the device 5 to be affixed and handled, whereas the distance d2 between the axes x—x' and the base of the support 3 may be equal to the distance between the base of the apparatus which can be provided with its fittings and the optical focus of the apparatus. The distance between the axis x—x' and the base of support 9 constitutes the clearance size which can rotate 360° around the horizontal axis x—x'. The distance d3 consists of the larger radius which may be traced between the optical focus O of the apparatus and any of the ends of said apparatus. As previously stated, the apparatus may be affixed to the support 3 so that the optical focus of the apparatus is always along axis x—x'.

One of the axes 6 of support 3 is directly or indirectly coupled to a driving system consisting of a reducing means 20a cooperating with a motor 21a, and the axis 10 is directly or indirectly coupled to a driving device consisting of a reducing means 20b cooperating with a motor 21b. The reduction rate is determined according to the desired accuracy and depends on the minimal motion of the motor. Thus, when a step-by-step motor having a step angle of 7.5° is used, the use of a reduction means having a rate of 750 enables an accuracy of 1/100 degree per step.

Each motor 21a, 21b is controlled by an electro-computing system 2. This electro-computing system 2 comprises an electronic control card 22 which respectively controls motors 21a, 21b, thus enabling the transmission to the motor of the orders received at the collector 23. The card comprises integrated circuits 24 set on a printed circuit and a microprocessor card 25 intended to read and to carry out the orders included in a control program. This card comprises a microprocessor and integrated circuits connected together by means of a printed circuit 26. Upon its connection, the microprocessor reads the logical program in, a ROM or Read-Only Memory 27. The informative or logical data of the ROM constitutes a program written in machine language adapted to the microprocessor that is used. This program comprises two parts, i.e., the procedure realized by the microprocessor and the digital data to be worked into the procedure. This data corresponds to the motions to be carried out by the motors with respect to the importance and the directions of the successives motions.

These two cards are connected to an electric supply system 28, consisting, for example, of batteries.

When the device of the invention is operated, a series of photographs may be taken to record and then to reconstitute a visual sphere. This process may be carried out as follows. As above stated, the term "visual sphere" is defined as the whole luminous reality which can be seen from any point of the environment. This reality may be projected either on a sphere or on any other volume located around the center of the sphere. Thus the method includes dividing a sphere into parts which may be replaced by plane surface areas or facings. These surface areas are then reassembled to form a "pseudosphere". The process is carried out as follows:

(1) Selection is made of a visual recording apparatus.

(2) The constitution of the images taken with the apparatus, and especially the aperture angle of the optic means, are previously measured or determined.

(3) The visual sphere is divided into as many facings as required, such that the assembled facings cover the whole sphere and possibly overlap each other while the orientation of each facing with respect to the latitude and the longitude is known.

(4) The images corresponding to these facings are recorded.

(5) The images thus recorded are used again to be projected on any space support of any volume located around the selected shot point. This shot point could be located in any point of the environment, independently from that which has been used as the shot point for the recording.

(6) Selection is made of a first image which is projected, then the following images are projected so that they continue the image previously projected. When all of the images have been projected, a sphere is constructed. As a projection technique, use may be made of:

either a manual procedure, by using for the projection the same optical means than that had been selected for the recoring process; or an automatic procedure where the sphere is cut into facings, the center of each facing being determined, using an optical recording apparatus affixed on a recording system so as to enable visual spheres as previously described to be made. The apparatus is located in each of the positions corresponding to the center of the facings and each image is recorded. These images are projected by means of a device again using the orientation which had been used for the recording. This device may be either mechanical (of the same type as the recording system) or a computing system.

In a process for reconstituting visual spheres, a spherical image may be formed from 20 images taken from the same shot point. These twenty images are obtained by orienting the recording apparatus according to two axes, one horizontal axis measured in degrees using a 360° scale and a vertical axis using a scale of 180°. The coordinates of the photographs are determined from a reference point O, the horizontal and vertical coordinates of the twenty images, referenced from a to t, are the following:

| REFERENCE | HORIZONTAL | VERTICAL |
|---|---|---|
| a | 0 | A |
| b | 72 | A |
| c | 144 | A |
| d | 216 | A |
| e | 288 | A |
| f | 0 | B |
| g | 72 | B |
| h | 144 | B |
| i | 216 | B |
| j | 288 | B |
| k | 36 | −B |
| l | 108 | −B |
| m | 180 | −B |
| n | 252 | −B |
| o | 324 | −B |
| p | 36 | −A |
| q | 108 | −A |
| r | 180 | −A |
| s | 252 | −A |
| t | 324 | −A |

A = 52.622632 and B = 10.812318.

Once these images are obtained, and which are taken by means of any recording apparatus, such as an optical means able to record in any direction (at least 75°), a masking of the images thus obtained must be carried out.

The image masking procedure may be carried out as follows:

An equilateral triangle is centered within each image, with the following coordinates: distance between the center of the triangle and a vertex being 37.377368°, i.e., for example, optical means having a focus distance of 15 mm, a distance of: (7.1 or 14.4)×(height of the image thus obtained). The triangle thus obtained will be used as a mask, the surface or area of said triangle being the useful surface of each image. The triangle centered within each image (i.e. in such a manner that the center of the image defined by the crossing of two diagonals and the center of the triangle defined by the crossing of the diagonals of the median lines must be superposed) may be oriented along the following two different manners:

(1) A vertex is oriented upwards along the axis defined by the vertical line into the image, this line passing through the center of the image. This orientation would be used by the traingles which are refered as follows: a, b, c, d, e, k, l, m, n, o.

(2) A vertex is oriented downwards along the axis defined by the vertical line into the image, this line passing through the center of the image. This orientation would be used for the triangles having the following references f, g, h, i, j, p, q, r, s, t.

Figure 2:
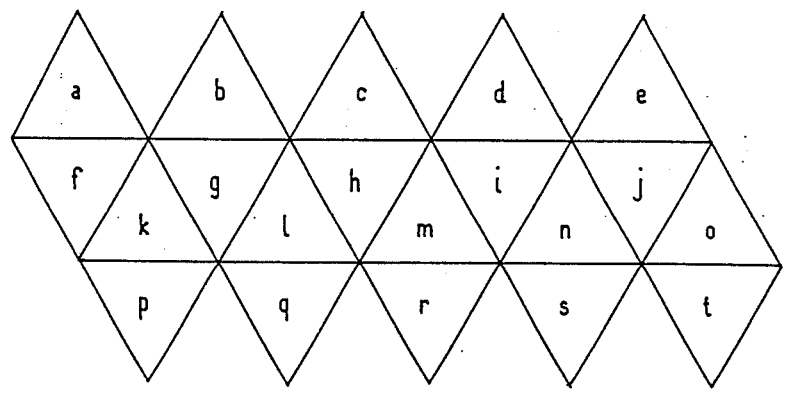
FIG. 2 is a plan view of a diagram of twenty images intended to rebuild the spherical image of a visual sphere.

As a result of this masking, use would be made as shown in FIG. 2, of twenty equilateral triangular images which would be assembled while taking into account the following continuities (continuity being defined as the fact that two triangles have a common side) a and f, b and g, c and h, d and i, e and j, f and k, k and g, g and l, l and h, h and m, m and i, i and n, n and j, j and o, o and f, k and p, l and q, m and r, n and s, o and t, a and b, b and c, c and d, d and e, a and e, p and q, q and r, r and s, s and t, p and t. Once these continuities are determined, it would be possible to make different uses of them, for example, By logical regularisation of these continuities and logical building up of this spherical image.

By manual regularisation of these continuities from material images on paper, film, screen or other supports.

These images would be then assembled either by folding or by other procedures to make a sphere. It should be noted that each image may be divided into a plurality of smaller images when it is desired to obtain more information or to use optical means having a larger focus.

As a visual sphere has been recorded and reconstituted, the basic image thus obtained may be used for making different items, devices, spaces, etc. For producing spaces and visual decorations, i.e., representing from a point a spherical landscape, the method is carried out as follows:

the different faces of the volume on which the spherical image has to be projected, are measured;

one point is selected within this volume, this point being the center of the projection;

the reference point O is fixed on the volume;

for each point of the volume it has to be determined what is the corresponding point within the basic image, this point being defined by the angular coordinates thereof (latitude and longitude);

this point is set on the volume by a printing process, by photography, by an electronic procedure, etc.;

the starting images may be graphically, photographically or electronically treated, and a plurality of spherical images may be partially mixed or mixed as a whole, or an image may be used for filtering another image, etc.

I claim:

1. A method of taking views and enabling visual spheres to be recorded, comprising the steps of:
   (a) taking photographs of a plurality of views from a first point, said plurality of views surrounding said first point and being at a predetermined lateral and longitudinal relationship to each other;
   (b) recording images from said views; and
   (c) placing said images about a second point in the same lateral and longitudinal relationship to each other as when the view were taken, wherein said first and second points are focal points of respective areas surrounding said first and second points.

2. The method according to claim 1, wherein said first point and said second point are identical or substantially identical.

3. The method according to claim 1, wherein said first point and said second point are different.

4. The method according to claim 1, wherein said images are recorded by a recording apparatus which is also capable of displaying said image, said images being placed about said second point by said recording apparatus.

5. The method according to claim 1, further comprising determining the center of each view, recording each image at the center of each view, and placing the images using the same orientation that was used for recording.

6. A method of taking views and enabling visual spheres to be recorded, comprising the steps of:
   (a) selecting a visual recording apparatus;
   (b) dividing the visual sphere into a plurality of facings and determining the orientation of each facing;
   (c) recording images of each facing from a single focal point within the sphere; and
   (d) locating the recording images in relation to a single focal point to form a sphere, the recorded images having the same orientation as said orientation of each facing.

7. The method according to claim 6, wherein the recorded images are located by projecting, by using the same optical means that was used for recording the images.

8. The method according to claim 6, wherein said recording step includes determining the center of each facing, recording each image at the center of each facing, and projecting the images using the same orientation that was used for recording.

9. The method according to claim 6, wherein said visual sphere is divided into twenty facings.

10. The method according to claim 6, wherein said facings are in the form of equilateral triangles.

11. An apparatus for taking views and enabling visual spheres to be recorded, comprising:
    (a) a first U-shaped fixing support having two legs, an axis on each of said legs, extending at substantially right angles to said legs, said axes being substantially aligned with each other;
    (b) a second U-shaped fixing support mounted for movement about a vertical axis, said axes of said first U-shaped fixing support being pivotally mounted in bearings in opposed legs of said second U-shaped fixing support; and
    (c) extensions of said axes of said first U-shaped fixing support and an extension of said vertical axis crossing at a focal point, an optical recording means being mounted on said first U-shaped fixing support at said focal point, wherein and optical recording means is able to rotate in any direction about said focal point and two perpendicular axes defined by the extensions of the axes of said first U-shaped fixing support and said vertical axis.

12. The apparatus according to claim 11, wherein said optical recording means is a video-optical device.

13. The apparatus according to calim 11, wherein each of said first and second U-shaped fixing supports are driven about their respective axes by motors connected to reduction means.

* * * * *

UNITED STATES PATENT AND TRADEMARK OFFICE
CERTIFICATE OF CORRECTION

PATENT NO. : 4,949,108

DATED : August 14, 1990

INVENTOR(S) : Jean-Michel VERRET

It is certified that error appears in the above-identified patent and that said Letters Patent is hereby corrected as shown below:

Title page, item [30], Foreign Application Priority
  Data, change "Aug. 18, 1986" to ---Aug. 11, 1986---.
    In the Abstract, line 11, insert ---of--- after "taking".
    In the Abstract, line 13, insert ---a--- before "complete".
    At column 1, line 24, change "devided" to ---divided---.
    At column 1, line 29, insert ---a--- before "visual".
    At column 1, line 30, change "for" to ---from---.
    At column 1, line 32, change "avoid" to ---said---.
    At column 1, line 38, change "on" to ---,---.
    At column 1, line 62, change "is and" to ---and is---.
    At column 2, line 6, insert ---be--- after "may".
    At column 2, line 7, change "devices" to ---device---.
    At column 2, line 8, insert ---be--- before "able".
    At column 2, line 14, insert ---card--- after "electronic".
    At column 2, line 22, change "drawings" to ---drawing---.
    At column 2, line 44, change "angle" to ---angles---.
    At column 2, line 49, change "U shaped" to ---U-shaped---.
    At column 2, line 53, change "the," to ---, the---.
    At column 2, line 54, change "axes" to ---axis---.
    At column 2, line 60, delete "to" before "two".
    At column 2, line 66, change "axes" to ---axis---.
    At column 3, line 32, delete "," after "in".
    At column 3, line 40, change "successives" to ---successive---.
    At column 4, line 12, delete "than".
    At column 4, line 13, change "recoring" to ---recording---.
    At column 4, line 34, change ", the" to ---. The---.

UNITED STATES PATENT AND TRADEMARK OFFICE
CERTIFICATE OF CORRECTION

PATENT NO. : 4,949,108

DATED : August 14, 1990

INVENTOR(S) : Jean-Michel VERRET

It is certified that error appears in the above-identified patent and that said Letters Patent is hereby corrected as shown below:

At column 5, line 8, change "of" to ---or---.

At column 5, line 14, change "traingles" to ---triangles---.

At column 5, line 14, change "refered" to ---referred to---.

At column 5, line 32, change "regularisation" to ---regularization---.

At column 5, line 34, change "regularisation" to ---regularization---.

At column 5, line 46, insert ---to--- after "point".

At column 6, line 6 (claim 1, line 10), change "view" to ---views---.

At column 6, line 58 (claim 11, line 16), change "and" to ---said--- after "wherein".

Signed and Sealed this

Thirtieth Day of March, 1993

Attest:

STEPHEN G. KUNIN

*Attesting Officer*  *Acting Commissioner of Patents and Trademarks*